US009356800B2

(12) United States Patent
Kopetz et al.

(10) Patent No.: US 9,356,800 B2
(45) Date of Patent: *May 31, 2016

(54) COMMUNICATION METHOD FOR THE TRANSMISSION OF TT ETHERNET MESSAGES IN A DISTRIBUTED REAL TIME COMPUTER SYSTEM

(71) Applicants: Hermann Kopetz, Baden (AT); Wilfried Steiner, Vienna (AT); Gunther Bauer, Vienna (AT); Matthias Wachter, Vienna (AT); Brendan Hall, Eden Prairie, MN (US); Michael Paulitsch, Columbia-Heights, MN (US)

(72) Inventors: Hermann Kopetz, Baden (AT); Wilfried Steiner, Vienna (AT); Gunther Bauer, Vienna (AT); Matthias Wachter, Vienna (AT); Brendan Hall, Eden Prairie, MN (US); Michael Paulitsch, Columbia-Heights, MN (US)

(73) Assignees: ITTech Computertechnik Aktiengesellschaft, Vienna (AT); Honeywell International, Inc., Morristown, NJ (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/749,777

(22) Filed: Jan. 25, 2013

(65) Prior Publication Data
US 2013/0142204 A1    Jun. 6, 2013

Related U.S. Application Data

(63) Continuation of application No. 12/595,414, filed as application No. PCT/AT2008/000126 on Apr. 7, 2008, now Pat. No. 8,396,934.

(51) Int. Cl.
*G06F 15/16* (2006.01)
*H04L 12/44* (2006.01)

(52) U.S. Cl.
CPC .......... *H04L 12/44* (2013.01); *H04L 12/40026* (2013.01); *H04L 12/417* (2013.01); *H04J 3/0655* (2013.01)

(58) Field of Classification Search
CPC .............................. H04J 3/0655; H04L 12/44
USPC .......... 709/207, 250–251; 370/392, 401, 445, 370/476; 713/170, 375
See application file for complete search history.

(56) References Cited

U.S. PATENT DOCUMENTS

| 4,866,606 A | 9/1989 | Kopetz |
| 5,892,765 A | 4/1999 | Shapard et al. |

(Continued)

FOREIGN PATENT DOCUMENTS

| AT | 411948 | 7/2004 |
| EP | 0658257 | 12/1996 |

(Continued)

OTHER PUBLICATIONS

The Time-Triggered Ethernet (TTE) Design, Hermann Kopetz, 1-12.*
International Search Report for PCT/AT2008/000126, mailed Nov. 19, 2008, completed by EP ISA.

(Continued)

*Primary Examiner* — Hitesh Patel
(74) *Attorney, Agent, or Firm* — Joseph E. Maenner; Maenner & Associates, LLC

(57) ABSTRACT

The goal of the present invention is to improve the useful data efficiency and reliability in the use of commercially available ETHERNET controllers, in a distributed real time computer system, by a number of node computers communicating via one or more communication channels by means of TT ETHERNET messages. To achieve this goal, a distinction is made between the node computer send time (KNSZPKT) and the network send time (NWSZPKT) of a message. The KNSZPKT must wait for the NWSZPKT, so that under all circumstances, the start of the message has arrived in the TT star coupler at the NWSZPKT, interpreted by the clock in the TT star coupler. The TT star coupler is modified, so that a message arriving from a node computer is delayed in an intelligent port of the TT star coupler until the NWSZPKT can send it precisely at the NWSZPKT into the TT network.

19 Claims, 2 Drawing Sheets

(51) Int. Cl.
*H04L 12/40* (2006.01)
*H04L 12/417* (2006.01)
*H04J 3/06* (2006.01)

(56) References Cited

U.S. PATENT DOCUMENTS

| | | | |
|---|---|---|---|
| 6,145,008 A * | 11/2000 | Kopetz | 709/236 |
| 2003/0227945 A1 | 12/2003 | Braff et al. | |
| 2005/0117596 A1 * | 6/2005 | Kopetz | 370/401 |
| 2015/0207559 A1 * | 7/2015 | Ryu | H04B 7/18528 455/450 |
| 2016/0006602 A1 * | 1/2016 | Angelow | H04L 12/1886 370/226 |

FOREIGN PATENT DOCUMENTS

| | | |
|---|---|---|
| EP | 1222542 | 4/2003 |
| EP | 1512254 | 5/2005 |
| WO | WO03/069843 | 8/2003 |
| WO | WO2007/028942 | 3/2007 |
| WO | WO2008/029320 | 3/2008 |

OTHER PUBLICATIONS

Kopetz, Hermann "Real-time Systems Design Principles for Distributed Embedded Applications", 2002 and 1997, pp. 50, 53, 59 and 65, Kluwer Academic Publishers, Boston, US.

Kopetz, Hermann et al., :The Time-Triggered Ethernet (TTE) Design, pp. 1-12, 1985.

* cited by examiner

| Preamble (7 bytes) | — 301 |
| --- | --- |
| Start Frame Delimiter (1 byte) | — 302 |
| Destination MAC Address ( 6 bytes) | — 303 |
| Source MAC Address (6 bytes) | — 304 |
| Tag Type (*88d7*) | — 305 |
| TT Control Field (2 bytes) | — 306 |
| Period ID (2 bytes) | — 307 |
| KNSZPKT (2 bytes) | — 308 |
| Message ID  NWSZPKT (2 bytes) | — 309 |
| MAC Client Data (0 to n bytes) | — 310 |
| PAD (0 to 64 bytes) | — 311 |
| Frame Check Sequence (4 bytes) | — 312 |

FIG. 3

COMMUNICATION METHOD FOR THE TRANSMISSION OF TT ETHERNET MESSAGES IN A DISTRIBUTED REAL TIME COMPUTER SYSTEM

CROSS-REFERENCE TO RELATED APPLICATIONS

This application is a Continuation of U.S. patent application Ser. No. 12/595,414, filed on Jul. 1, 2010, now U.S. Pat. No. 8,396,934, issued on Mar. 12, 2013, which is a 371 of application No. PCT/AT2008/000126 on Apr. 7, 2008.

BACKGROUND OF THE INVENTION

The present invention pertains to a communication method for transmitting TT ethernet messages in a distributed real time system, comprising a plurality of node computers, wherein each node computer has at least one ethernet controller, which ethernet controller is directly connected via a data line to a port of a TT star coupler clearly assigned to the node computer, and wherein a plurality of TT star couplers may be directly or indirectly connected to one another via one or more data lines in order to form a closed TT network.

Furthermore, the present invention pertains to a TT star coupler for relaying ethernet messages in an above-mentioned communication method.

In the past 20 years, IEEE Ethernet Standard 802.3 has become so widely accepted that the costs for ethernet-based communication systems have decreased very sharply based on the present mass market for ethernet controllers in the field of personal computers. For these cost reasons, ethernet has also been increasingly used in real time data processing. In European Patent EP 1 512 254, a method is disclosed, which makes it possible to transmit time-triggered messages with good real time property in an expanded ethernet system—called TT (time-triggered) ethernet below.

In TT ethernet, a distinction is made between two categories of messages, conventional ethernet messages (called ET (event-triggered) messages below) and new TT messages. TT messages are characterized in that they contain in the ethernet type field a bit pattern (bit pattern 88d7) authorized by the ethernet standard management of IEEE. While ET messages (i.e., conventional ethernet messages) come from a temporally uncoordinated, open environment and hence may be in temporal conflict with one another, it is assumed in TT ethernet that all TT messages can be transmitted without obstructing one another according to an a priori set schedule in a closed TT network. The closed TT network comprises a number of node computers that communicate via one or more TT star couplers.

The useful data efficiency of the transmission of TT messages in TT ethernet depends greatly on the precision II of the clock synchronization of TT ethernet controllers in the node computers, since the time interval between two TT messages must be greater than twice the precision II to be able to rule out any collision of TT messages. A hardware support requires a very precise clock synchronization (approximately in the range of 1 µsec), which is not found in commercially available ethernet controllers. If the clock synchronization is performed in the software, then it is difficult to realize a precision higher than 50 µsec, i.e., a time interval of at least 100 µsec must be scheduled between two TT ethernet messages in order to rule out a collision of TT messages in the TT network. If it is assumed that the transmission time of many TT messages in a 100 Mbit/sec ethernet system is substantially shorter than 100 µsec, then a useful data efficiency of far less than 50% may occur when using commercially available ethernet controllers.

BRIEF SUMMARY OF THE INVENTION

The present invention provides an improvement in the useful data rate and the data safety in a distributed real time computer system, in which the node computers communicate by means of time-triggered ethernet messages, as disclosed, e.g., in EP 1 512 254.

The present invention also provides a network send time, e.g., a periodic network send time, being a priori allocated to each TT ethernet message by a scheduler, wherein the port of the TT star coupler delays a TT ethernet message arriving from the node computer until the next network send time for this type of TT ethernet message is reached on its clock, and wherein the port sends this TT ethernet message into the TT network exactly at this network send time or within an exactly upwardly limited time interval beginning at this network send time.

A distinction is thus made between the node computer send time (KNSZPKT) and the network send time (NWSZPKT) of a message. According to the present invention it is proposed to modify the TT star coupler so that a TT ethernet message arriving from a node computer is delayed in an intelligent port of the TT star coupler up to the NWSZPKT in order to then be able to send it precisely at the NWSZPKT into the TT network. The KNSZPKT, interpreted by the clock of the sending node computer, must lie in due time before the NWSZPKT, so that under all circumstances (i.e., even if the clocks of node computers and TT star couplers lie at the limits of the precision interval), the start of the message has arrived in the TT star coupler at the NWSZPKT, interpreted by the clock in the TT star coupler. In the interval between KNSZPKT and NWSZPKT, a temporal and semantic checking of the arriving TT message can also be performed by the intelligent port of the TT star coupler in order to improve fault detection. Since the node computer and TT star coupler form two separate fault containment regions, the probability of a fault propagation by a false message can be reduced by a checking of the message in the independent TT star coupler. Furthermore, the intelligent port of the TT star coupler can code the message arriving from the node computer, so that the TT messages are transmitted in the network in a coded form.

Other advantageous embodiments are given in the dependent claims.

The following significant economic benefits result from the present invention:

The useful data efficiency of the transmission of TT messages can be increased to far more than 90% even if using commercially available ethernet controllers, which perform the clock synchronization in software.

The checking of a TT message in the intelligent port of the TT star coupler reduces the probability of fault propagation and makes the diagnosis easier.

The coding of the message in the intelligent port of the TT star coupler increases the safety of the real time system without putting an additional burden on the application computer.

Conventional ethernet controllers can be used without changes in the hardware for the transmission of TT messages and ET messages.

BRIEF DESCRIPTION OF THE DRAWINGS

The present invention is explained in detail below based on the drawings in a nonlimiting example. In these drawings, FIG. 3 shows the structure of a TT ethernet message.

DETAILED DESCRIPTION OF THE PRESENT INVENTION

An embodiment of the novel method in a possible example with three node computers, which are connected via a TT star coupler, is shown in the following paragraph.

Figure 1:
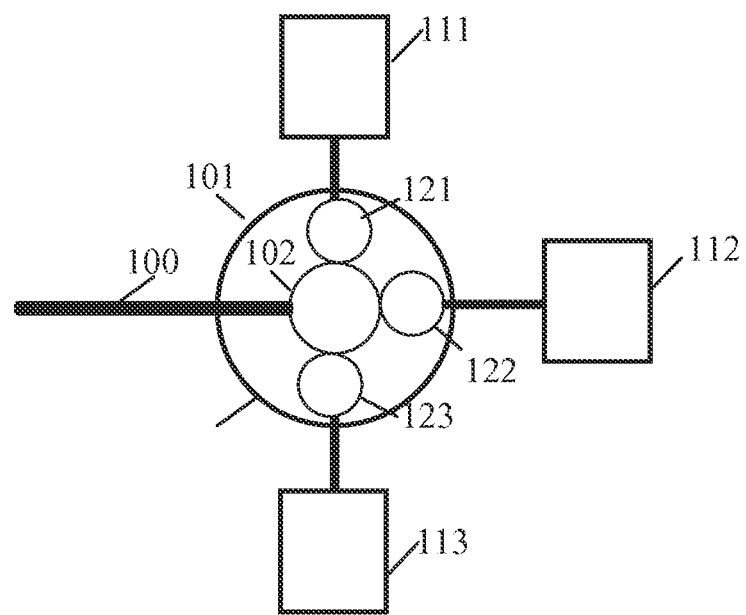
FIG. 1 shows the structure of a distributed computer system with a TT star coupler.

FIG. 1 shows a distributed computer system with a TT star coupler 101. It comprises the three node computers 111, 112, 113, which are connected to the TT star coupler 101 via bidirectional lines. The TT star coupler 101 may be connected to other TT star couplers via the line 100 and thus may be part of a time-triggered (TT) network, which comprises a plurality of TT star couplers. It is assumed that the clocks of all TT star couplers that form a TT network have a common time basis of high precision (better than 1 µsec). The TT star coupler 101 comprises the three intelligent ports 121, 122, 123, which are able to exchange messages via the actual ethernet switch 102. Each of the intelligent ports 121, 122, 123 has an autonomous processing capacity, so that messages can be received in parallel and be processed in the ports at the same time. For example, each port may have its own computer with local memory for processing messages. A TT ethernet message arriving from a node computer, e.g., the node computer 111, at the assigned port 121 is delayed in the port 121 until the next, periodically returning network send time (NWSZPKT) for this type of message is reached. In TT ethernet, a type of message is clearly set by the periodic send time of a node computer in a TT network. In contrast thereto, according to the present invention, the type of TT message is clearly determined by the periodic network send time (NWSZPKT) of a message.

Figure 2:
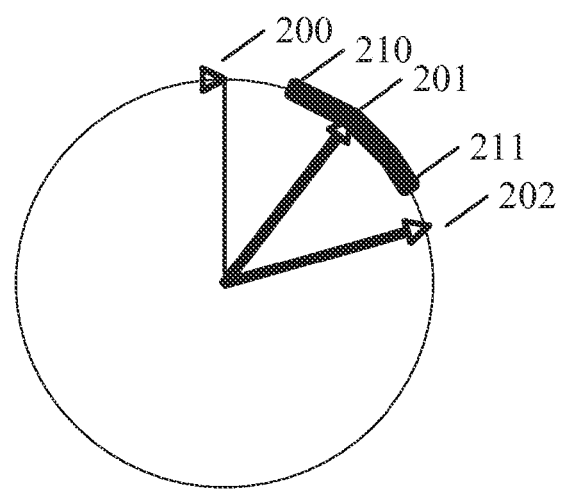
FIG. 2 shows the send times of a message.

FIG. 2 shows the time sequence of sending a periodic time-triggered message in a cyclic representation of the period in the example of sending a message by the node computer 111 and the port 121. The time moves clockwise in FIG. 2. Since the network send time NWSZPKT 202 of the intelligent port 121 (as well as the send times of the other ports 122, 123 and of the other ports of the other TT star couplers of the closed TT network connected via the connection 100) is based on a time basis of high precision (a precision higher than 1 µsec can easily be achieved with corresponding hardware support), a message scheduler can perform the scheduling of collision-free transmission of the TT messages in the closed TT network with a given small interval between two messages due to the precision of this time basis and can thus realize a high useful data rate in the TT network. After setting the network send times NWSZPKT 202, in a second phase, the scheduling of the time of sending a TT message by the node computer, the KNSZPKT 201, is set. Since the KNSZPKT 201 is interpreted by the clock of the node computer, but the network send time NWSZPKT 202 is interpreted by the clock of the TT star coupler, the given precision of the clock synchronization between the node computer and the star coupler must be taken into account in the scheduling of the node computer send time KNSZPKT 201, so that, even in the borderline case of the worst synchronization, the start of the message has arrived in due time in the port of the TT star coupler before the network send time NWSZPKT 202. The time interval between KNSZPKT and NWSZPKT must be greater than twice the precision of this clock synchronization plus the duration of transmission of the first bit of the message and the duration of an optional pre-processing of the message in the port of the TT star coupler. Furthermore, it must be guaranteed that the rest of the message is available in the port before this rest of the message must be sent, so that a sending operation, once it has begun, does not have to be interrupted.

If the clock of the node computer is not synchronized with the clock of the TT star coupler, then the KNSZPKT 201 is random. In this degenerated case, a message arriving from a node computer is delayed in the port of the TT star coupler until the next periodic NWSZPKT 202 for this type of TT message is reached. If a plurality of TT messages of the same type of TT message arrive during a single message period, then a fault message is generated at a diagnostic computer and none of the TT messages are sent further, since obviously a fault has occurred.

The precision of the clock synchronization between the TT star couplers of the TT network and a node computer that can be achieved depends essentially on the type of clock synchronization in the node computer, since it is assumed that all TT star couplers have a clock synchronization of high precision supported by corresponding hardware. If a clock synchronization is achieved via software in the node computer, then it may be difficult to achieve a precision higher than 50 µsec. However, if the node computer has special synchronization hardware, e.g., a clock synchronization hardware corresponding to the IEEE 1588 standard, then a considerably higher precision can be achieved. Thus, the present invention supports end systems of different grades, which are equipped with different commercially available ethernet controllers, without reducing the useful data efficiency of TT ethernet message transmission in the TT network.

The attributes of a TT message, such as KNSZPKT 201 and NWSZPKT 202, as well as a predicate of a message, to be optionally checked by the star coupler, must be known before sending the TT message. These attributes may be set either statically by an off-line scheduler before the running time or they may be dynamically determined on-line by a TT ethernet service node at the prompting of a node computer immediately before sending the message. A node computer may also prompt a TT ethernet service node via standard ET ethernet messages to dynamically schedule a new TT message. Such a TT ethernet service node may be connected to the TT star coupler 101, like any other ethernet node computer. For example, in FIG. 1 the node 113 may be such a TT ethernet service node. In another expression of the same invention, the TT ethernet service node may also be integrated in the TT star coupler. Such a TT ethernet service node may also have access to an exact, external time basis, e.g., via a GPS receiver or via an atomic clock. The TT ethernet service node may distribute this external time via ethernet messages to all TT star couplers and node computers in the subject TT network. The distribution of the time can take place corresponding to an existing standard, e.g., the IEEE standard 1588. This standard is already supported by the hardware of a few microcomputers. If a node computer supports such a synchronization standard, then the time interval between KNSZPKT 201 and NWSZPKT 202 can be kept short based on the achievable high precision of the clock of the node computer and thus the latency in the transmission of real time information can be reduced. If such a hardware-based support of the clock synchronization is not given in the node computer, a longer transmission latency must be accepted.

If the TT ethernet service node sends the network send times NWSZPKT 202 of all TT messages a priori to all TT star couplers affected by the message transport, then the TT star couplers can already keep clear or clear corresponding to the transmission channels of ET messages needed for the transport of the TT message at NWSZPKT in due time before the arrival of a TT message and thus make possible the transport of a TT message at NWSZPKT with minimal latency on the reserved free lines. Such a minimal message latency, in which the delay amounts to only a few bits in a star coupler (i.e., only small fractions of a µsec in a 100 Mbit/sec ethernet system), it is especially important in systems that contain a plurality of TT star couplers, for example, when a bus cabling shall be supported by connecting many TT star couplers in series and the simultaneous arrival of a TT message in a plurality of node computers is important.

To guarantee that the global time, all NWSZPKTs of the TT messages and all attributes needed for fault recognition of the ethernet messages expected at a port are present again within a prespecified restart time in the TT star couplers at the intelligent ports 121, 122, 123 of the TT star coupler after a transient failure of the TT star coupler, the global time and the TT message attributes are sent periodically from one or more service nodes to the TT star couplers. The TT star coupler 101 periodically passes the global time on to the node computers 111, 112, 113 assigned directly to it, so that the node computers can be synchronized to the global time.

In a distributed real time system, each node computer 111, 112 and 113 and the star coupler 101 form a Fault Containment Unit (FCU), i.e., they shown the immediate results of a fault (software or hardware) only within the FCU consequences. An FCU can indirectly have a negative effect on the communication system and other node computers via fault messages (in value or time range). The faulty FCUs must therefore be isolated. If only one of the node computers 111, 112, 113 is faulty, then, in the general case, no assumptions about the behavior of the faulty node computer can be made. Therefore, a fault isolation is only possible if two independent FCUs are present, one FCU (e.g., the node computer 111) shows a faulty behavior, while an independent second FCU (e.g., the TT star coupler 101) recognizes this faulty behavior and prevents fault propagation. Corresponding to the present invention, a distinction is made between trusted and not trusted units. It is assumed that the star coupler 101 and the TT ethernet service node are trusted and the node computers 111, 112, 113 are generally not trusted. The trusted star coupler 101 prevents a fault of a node computer 111, 112, 113 from being able to have adverse effects on the time behavior of the transmission of TT messages of fault-free node computers, whether in the hardware or software, whether accidental or intentional (security breach). To prevent a malicious sender from being able to send false TT message attributes to the TT star coupler, these TT message attributes are transmitted from the TT service node to the TT star coupler in a cryptographically coded form.

If a further preprocessing of the message is performed in the intelligent port 121, then the WCET (Worst Case Execution Time) of this preprocessing is to be included in the scheduling of the time interval between KNSZPKT 201 and NWSZPKT 202. Such a preprocessing may be that the contents of the message are coded in the intelligent port 121 or that a predicate is checked via the contents of the message in order to reduce the probability of fault propagation by a fault in the value range, caused by the node computer 111. Furthermore, an expected window of receipt with the start time 210 and end time 211 can be predetermined in the scheduling of the message, so that a fault in the time range of the mode computer 111 can be recognized by the port 121 of the independent TT star coupler 101. If a fault is recognized by the port 121, then port 121 will send an ET diagnostic message to a diagnostic computer. Since the node computer 111 and the assigned port 121 are arranged in two independent Fault Containment Regions, it is ruled out that only one fault source causes a fault and at the same time turns off the fault detection. For this reason, the observation of the behavior by the node computer 111 in the assigned intelligent port 121 is an especially effective way to detect faults.

The intelligent port assigned to a node computer, e.g., the port 121 in relation to the node computer 111, may cryptographically code an arriving TT message before it is sent into the network. The port 121 must correspondingly decode all coded messages arriving from the network before a message is transmitted to the node computer 111. The code management for coding and decoding TT messages takes place with coded ET messages.

FIG. 3 shows a possible structure of a time-triggered (TT) ethernet message. The fields 301 to 305 and the fields 310 to 312 are predetermined in the ethernet standard. In agreement with the IEEE ethernet standard management, it was set forth that all protocol-specific TT ethernet messages in the tag type field 305 contain the bit pattern 88d7 in order to be able to clearly identify each TT ethernet message worldwide. Application messages may optionally be depicted in temporal relation to TT messages and thus may be provided with exactly defined time behavior. Such messages retain the already predefined tag type field. As an example, a two-byte TT control field 306 in a possible, but not the only possible embodiment of the present invention is provided in FIG. 3. The first byte of the field 306 contains control information about the TT message, e.g., whether the TT message is a synchronization message. By means of another bit in the TT control field 306, a distinction is made whether the message is a periodic TT message or a sporadic TT message. A periodic TT message is sent in each period assigned to this type of TT message. A sporadic TT message is not sent in each period assigned to this type of message. While a periodic TT message can be interpreted by the receiver node as a vital sign of the sender node, whose failure announces a transient or permanent failure of the sender, this is not the case in a sporadic TT message.

The second byte of the field 306 contains the length of the TT ethernet message, which is measured in units of 8 bytes. The field 307, the period ID, sets the position of the current period in the global time with a horizon of 16 bits. The KNSZPKT 201, which is interpreted by the clock of the node computer, is contained in field 307. The network send time NWSZPKT 202, which is interpreted by the clock of the TT star coupler, is contained in field 308. The NWSZPKT also clearly defines the type of TT ethernet message, i.e., the message ID. As already mentioned, the network send times NWSZPKT 202 of all TT messages must be scheduled by a scheduler so that there is no collision of TT messages in the given TT network. By contrast, it is possible that a plurality of node computers may send their TT message at the same KNSZPKT 201 at the ports of the TT star couplers assigned to them.

Finally, summarized once again, the goal of the present invention is to provide an improvement in useful data efficiency and safety when using commercially available ETHERNET controllers in a distributed real time computer system by a number of node computers communicating via one or more communication channels by means of TT ETHERNET messages. To achieve this goal, a distinction is made between the node computer send time (KNSZPKT) and the network send time (NWSZPKT) of a message. The KNSZPKT, interpreted by the clock of the sending node computer, must lie in due time before the NWSZPKT, so that under all circumstances (i.e., even if the clocks of node computers and TT star couplers lie at the limits of the precision interval) the start of the message has arrived in the TT star coupler at NWSZPKT, interpreted by the clock in the TT star coupler. It is proposed to modify the TT star couplers so that a message arriving from a node computer is delayed in an intelligent port of the TT star coupler until NWSZPKT in order to be able then to send it into the TT network precisely at NWSZPKT.

The above-described concrete embodiment of the present invention represents only one of many embodiment possibilities of the present invention.

What is claimed is:

1. A communication method for the transmission of TT ethernet messages in a distributed real time computer system, the computer system comprising a plurality of node computers, wherein each node computer has at least one ethernet controller, wherein the ethernet controller is connected via a data line directly to a port of a TT star coupler clearly assigned to the node computer, and wherein a plurality of TT star couplers can be directly or indirectly connected to one another via one or more data lines in order to form a closed TT network, wherein the communication method comprises:
   a scheduler a priori allocating a network send time to each TT ethernet message;
   a port of the TT star coupler delaying a TT ethernet message arriving from the node computer until the next network send time for this type of TT ethernet message is reached on its clock; and
   the port sending the TT ethernet message into the TT network exactly at the network send time or within an exactly upwardly limited time interval beginning at the network send time;
characterized in that a TT star coupler clears the transmission channels needed for the transmission of a TT message between TT star couplers and node computers in due time for the expected TT message based on the a priori knowledge of the future network send time of the TT messages.

2. The communication method in accordance with claim 1, characterized in that a periodic node computer send time is a priori allocated to a type of TT ethernet message by a scheduler, which node computer send time is interpreted by the clock of the sending node computer and which sets the scheduled send time of the message from the node computer to the assigned port of the TT star coupler of a message, and wherein the interval between the node computer send time and the network send time is longer than twice the precision of the clock synchronization between the clock of the node computer and of the TT star coupler plus the duration of the transport of the first bit of the message and the duration of an optional preprocessing of the TT ethernet message in the autonomous TT star coupler port, so that the start of the message is ready in due time before the network send time for the transmission into the TT network and consequently the entire message is continuously made ready in due time for the further, continuous transmission into the TT network.

3. The communication method in accordance with claim 1, characterized in that the periodic network send time is contained in the received TT message.

4. The communication method in accordance with the claim 1, characterized in that the periodic node computer send time is contained in the TT message.

5. The communication method in accordance with claim 1 characterized in that the intelligent port of a TT star coupler receives from an independent TT ethernet service node the global time and the attributes, specified in the time range, of the TT messages expected at this port and dynamically checks whether an arriving TT message corresponds to these a priori specified attributes.

6. The communication method in accordance with claim 1, characterized in that the intelligent port of a TT star coupler dynamically checks the attributes, specified in the value range, of the TT messages expected at this port whether an arriving TT message corresponds to these a priori specified attributes.

7. The communication method in accordance with claim 5, characterized in that the intelligent port of a TT star coupler periodically receives from one or more independent TT ethernet service nodes the global time and the specified attributes of the TT messages to be received, so that, within a period after the transient failure of the TT star coupler, the TT star coupler again has available all status information needed for satisfying fault detection.

8. The communication method in accordance with claim 5, characterized in that the independent TT ethernet service node transmits the TT message attributes to the ports of the TT star couplers in a cryptographically coded form.

9. The communication method in accordance with claim 1, characterized in that the intelligent port of a TT star coupler sends an ET ethernet message to a diagnostic computer if an arriving TT message of one or more of the specified attributes violates the time range or the value range.

10. The communication method in accordance with claim 1, characterized in that the TT star coupler periodically forwards the global time to the node computers directly connected to the TT star coupler.

11. The communication method in accordance with claim 1, characterized in that the intelligent port of a TT star coupler codes an arriving TT message cryptographically.

12. The communication method in accordance with claim 1, characterized in that the intelligent port of a TT star coupler assigned directly to the node computer cryptographically decodes a message arriving from the network before the message is sent to the node computer.

13. The communication method in accordance with claim 11, characterized in that the information needed for the code management for the coding and decoding of the TT messages is transmitted in coded ET messages.

14. The communication method in accordance with claim 1, characterized in that a distinction is made between periodic and sporadic TT messages.

15. The communication method in accordance with claim 1, characterized in that, in a first phase, a conflict-free time schedule for the network send times of all TT messages is calculated, taking into account the good precision of the TT star coupler clocks and, in a second phase, based on this time schedule, the node computer send times of the TT messages to be sent by the node computers are determined, taking into account the individual precision of each individual node computer and an optional preprocessing of the message in the port of the TT star coupler assigned to the message.

16. A TT ethernet service node computer, characterized in that the TT ethernet service node computer carries out the communication method of claim 15 dynamically on-line.

17. A TT star coupler for relaying ethernet messages in a communication method in accordance with claim 1, characterized in that the TT star coupler comprises a central switch and a number of intelligent ports, wherein each of the ports contains an autonomous intelligent subsystem with its own CPU and memory, and wherein the subsystem is additionally set up to process arriving ethernet messages in parallel.

18. The TT star coupler for relaying ethernet messages in accordance with claim 17, characterized in that the clocks of all TT star couplers that form a TT network are synchronized in a highly precise manner.

19. A TT star coupler for relaying TT ethernet messages, characterized in that the TT star coupler carries out one or more of the process steps specified in claim 1.

\* \* \* \* \*